UNITED STATES PATENT OFFICE.

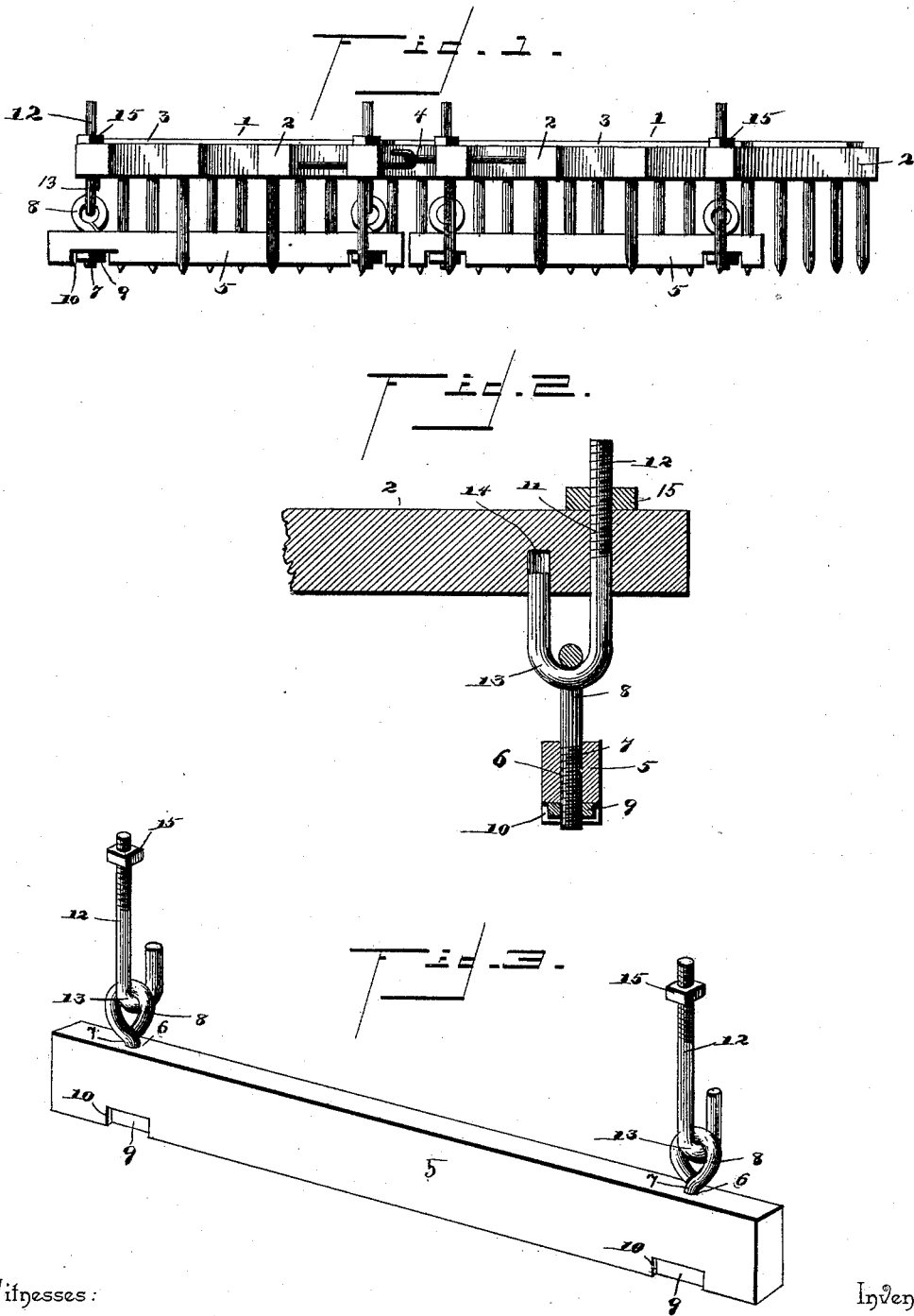

JOHN HENRY REVIS, OF VERNON, ILLINOIS.

ADJUSTABLE DRAG FOR HARROWS.

SPECIFICATION forming part of Letters Patent No. 430,972, dated June 24, 1890.

Application filed February 28, 1890. Serial No. 342,071. (No model.)

*To all whom it may concern:*

Be it known that I, JOHN HENRY REVIS, a citizen of the United States, residing at Vernon, in the county of Marion and State of Illinois, have invented a new and useful Adjustable Drag for Harrows, of which the following is a specification.

The object of this invention is to provide a drag for attachment to harrows, which drag is adapted by its peculiar construction and arrangement to thoroughly drag both sides of a ridge simultaneously as well as an intermediate furrow.

A further object of the invention is to provide a simple and economical means for adjusting the drag so as to take more or less into the surface of the earth.

Referring to the drawings, Figure 1 is a rear elevation of that class of harrows formed in sections, loosely connected at their adjacent edges and provided with a drag constructed in accordance with my invention. Fig. 2 is a longitudinal vertical section of one of the end beams of a harrow, illustrating the manner of connecting the drag therewith. Fig. 3 is a perspective of the drag detached.

Like numerals of reference indicate like parts in all the figures of the drawings.

The harrow in this instance comprises two sections 1, each section consisting of a series of parallel diagonally-disposed bars or beams 2, connected by transverse strips 3. The inner bars of each section are provided with interlocking eyes 4, so that the sections are capable of independent movement.

Although I have herein illustrated the hereinafter-described attachment to this particular style of harrow, yet, as will be apparent, the attachment may be applied to various styles of harrows, and this with little or no change of construction.

The drag comprises a drag-bar 5, near each end of which are provided vertical openings 6, through which are inserted bolts 7, terminating at their upper ends in eyes 8. Upon the lower ends of the bolts are threaded nuts 9, which nuts are seated in recesses 10, formed in the lower edge of the drag-bar 5. A bar of the above description is employed with each harrow-section, and each section has its outer harrow-beams provided with a vertical perforation 11 near their rear ends, and mounted in the perforations are bolts 12, the lower ends of which depend below the harrow-beams and are provided with hooks 13, the ends of the hooks resting in recesses 14, formed in the under surface of the beams. The upper ends of the bolts 12 are threaded and provided with adjusting-nuts 15, by which said bolts can be raised and lowered. The hook portions 12 of the bolts each connect with the eye 8 of a bolt 7, so that the drags—in this instance two in number—are trailed along the ground, and may be adjusted up or down, so as to take more or less into the soil.

It will be apparent that a pair of harrow-sections constructed after the manner herein illustrated and described, drawn along a ridge, that the drag bars thereof will simultaneously operate at each side of the ridge.

Having thus described my invention, what I claim is—

1. The combination, with a harrow, of a series of vertically-adjustable bolts terminating in hooks depending from the same, and a drag-bar provided with eyebolts interlocking with the hooks of the harrow, substantially as specified.

2. The combination, with a pair of harrow-beams provided with vertical openings, of adjustable bolts mounted in the openings and terminating at their lower ends in hooks, occurring opposite recesses formed in the bottoms of the beams, nuts threaded on the upper ends of the bolts, and a drag-bar having vertical perforations agreeing with those in the harrow-beams, and provided with eyebolts interlocking with the hooks of said beams, and provided at their lower end with nuts seated in recesses formed in the bottom of the drag-bar, substantially as specified.

3. The combination, with two loosely-connected harrow-sections, each provided with depending vertically-adjustable bolts terminating at their lower ends in hooks arranged at opposite sides and near its rear end, of a pair of drag-bars, one arranged under each section, and each provided with eyebolts engaging the hooks of its respective section, substantially as specified.

In testimony that I claim the foregoing as my own I have hereto affixed my signature in presence of two witnesses.

JOHN HENRY REVIS.

Witnesses:
A. B. MORTON,
I. J. COX.